May 3, 1927.
S. RUBEN
1,627,204
APPARATUS FOR INDICATING THE PRESENCE AND THE CONCENTRATION
OF GASES AND VAPORS IN ATMOSPHERE
Filed Nov. 23, 1921  2 Sheets-Sheet 1
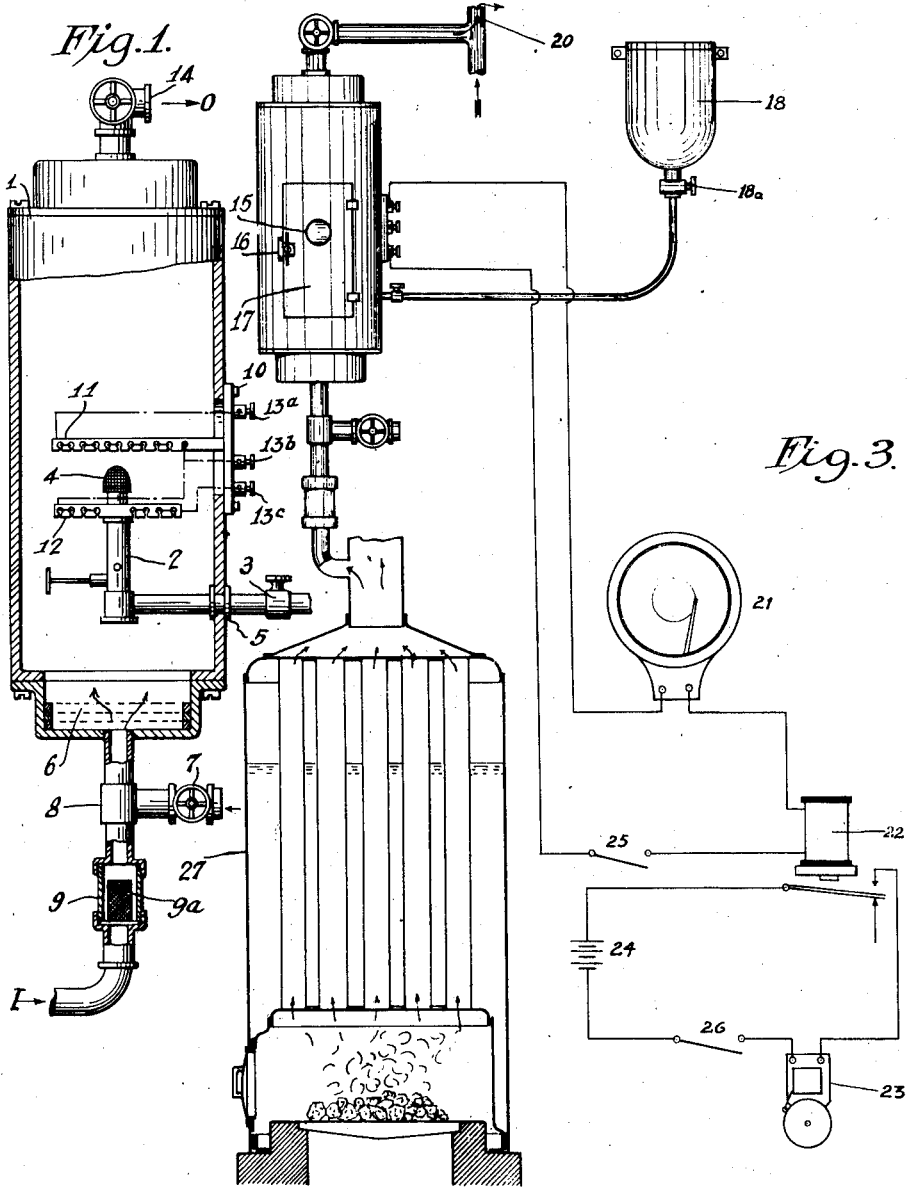
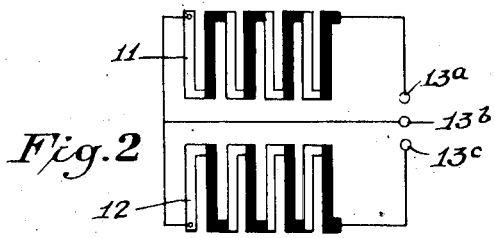
INVENTOR
Samuel Ruben
BY
M. W. Clephane
ATTORNEY

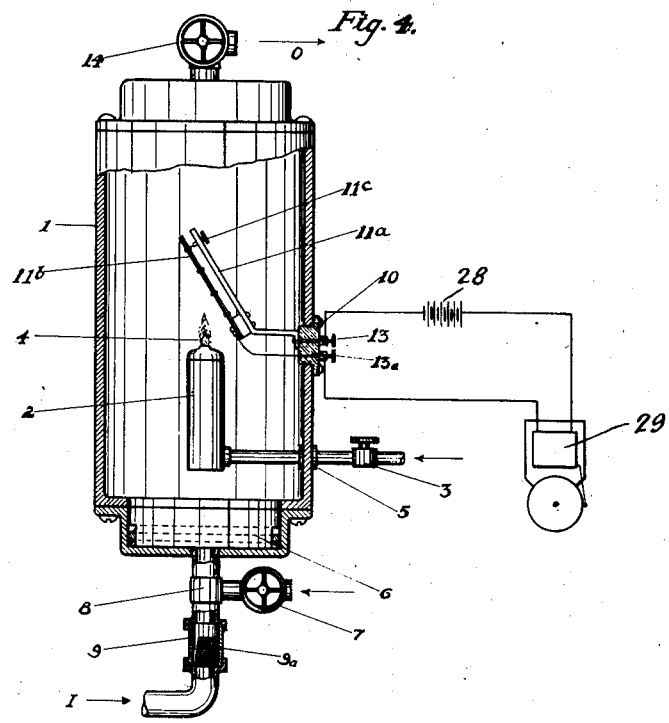
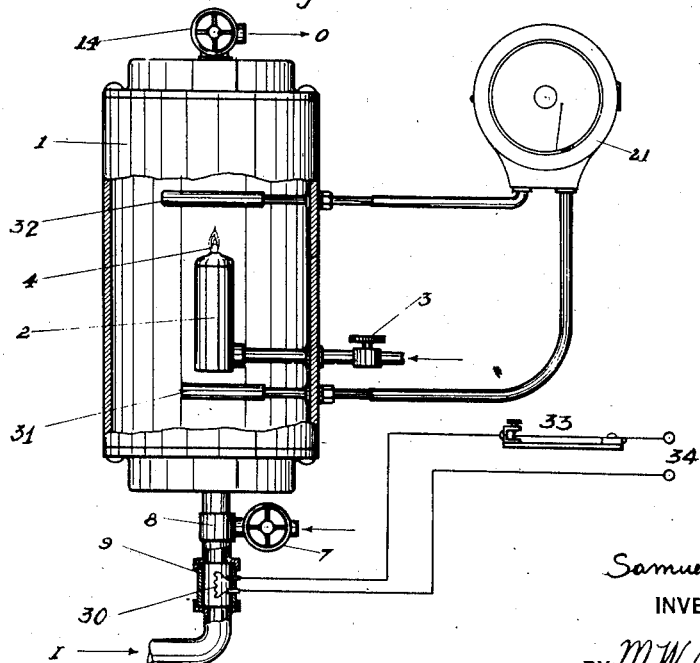

Patented May 3, 1927.

1,627,204

UNITED STATES PATENT OFFICE.

SAMUEL RUBEN, OF NEW YORK, N. Y.

APPARATUS FOR INDICATING THE PRESENCE AND THE CONCENTRATION OF GASES AND VAPORS IN ATMOSPHERE.

Application filed November 23, 1921. Serial No. 517,416.

This invention relates to a system for detecting the presence and indicating the concentration of gases and vapors in an atmosphere.

While my invention is generally applicable to the detection of gases and vapors, it is especially adaptable for use in testing exhaust gases of combustion, and atmospheric conditions in mines and other confined spaces. But I would have it expressly understood that in no way do I limit myself to the specific application or embodiment of my invention, which I have selected as a basis for illustrating and describing my invention merely for the purpose of rendering a clear and comprehensive understanding of the scope and novel features thereof.

My invention broadly comprehends the provision and arrangement of means for detecting the presence and indicating the concentration of gases and vapors which, on being conveyed with supporting atmosphere to a source of combustion, will affect the temperature, the variations being employed for the purpose stated. If the combustible content of an atmosphere supporting a flame or other source of combustion, is increased or diminished, the fuel supply and other conditions being constant, the temperature of the flame will correspondingly vary. Likewise, if a non-combustible gas or vapor be admitted with the supporting atmosphere, and the oxygen content be reduced, the temperature of the flame will be reduced.

If a temperature responsive element be so placed as to be affected by such temperature variations, the response may be employed to indicate the presence and concentration of combustible gases and vapors by suitable indicating and recording devices, which may be placed at any convenient distance.

The heat responsive element may be of any form, such as a high temperature thermometer, or a confined liquid, gas or vapor, from which readings and automatic records may be made. This element may also be of any form of thermo electrically responsive element, such as a wire, through which a current is passed, the conductivity changing with the temperature; or it may be in the form of a thermo couple in which thermo electric currents are set up, or a thermo static or bi-metallic device, adjusted to function within predetermined limits. The types of responsive and controlled means may be selected according to the purpose for and the place in which the system is to be used and is best adapted.

To specifically illustrate my invention and one embodiment of its application, I have shown it as employed to indicate combustion efficiency of a furnace, a portion of the exhaust gases and vapors from which are drawn off and passed with the supporting atmosphere to a source of combustion, such as an alcohol flame, in a chamber. The temperature responsive element is thermo electric, or thermo couples, placed above the flame. I have also shown a means for compensating for temperature variations of the gases and vapors before entering the flame area.

In proportion to the completeness of combustion in the furnace, carbon dioxide is contained in the exhaust gases, with the resultant diminution of atmosphere oxygen content, the proportion thereof being indicated by the temperature variations of the flame, to which a portion of the exhaust gases have been led with the supporting atmosphere. Flame temperature changes cause current variations in the responsive element, which are indicated by suitable devices outside of the chamber.

An excess of carbon monoxide in the flue exhaust would be indicated in the opposite direction from that of carbon dioxide. In small percentages, carbon monoxide may be oxidized intermittently to carbon dioxide, the difference indicated on the meter, being due to the carbon monoxide content.

The commonly used method for indicating combustion efficiency is to pass the flue gases through a chemical absorber, the absorbed content being indicated by a volumetric difference.

I shall now proceed to describe one embodiment of my invention with reference to the accompanying drawings, which show a specific application thereof, and then proceed to point out with more particularity the essential elements of novelty in the annexed claims.

Referring to the drawings;

Figure 1, illustrates the chamber containing the source of combustion and the responsive element.

Figure 2 shows the electrical connection of the thermo couples used as the responsive element.

Figure 3 illustrates the complete device with the indication means, and connected with a furnace exhaust outlet.

Fig. 4 shows in outline the device having a thermostat element in an electric circuit in which a signal device is connected.

In Fig. 5 the temperature responsive element is a gas containing vessel which is connected to a recording device.

Referring to Figure 1, I is the inlet pipe to the metal chamber, 1, within which is burner, 2, the fuel supply thereto, being controlled by valve, 3. The metal gauze net, 4, affixed to the top of the burner, serves to aid in keeping the flame constant. Locknut, 5, holds the burner support to the side of chamber, 1. Disks, 6, of perforated metal, spread the gases or vapors entering the chamber, 1. Valve, 7, controls the admission of atmosphere through T, 8. In tube, 9, is a metal screen, 9$^a$, a filter for the entering gases. Binding posts, 13$^a$, 13$^b$, and 13$^c$ are held by an electrical insulation base, 10, capable of withstanding temperature effects. The flow of gases through chamber, 1, is controlled by valve, 14. Centre connection for testing purposes is provided by binding post, 13$^b$.

Referring to Figure 2, 11 and 12 are the thermo couples employed as temperature responsive elements, the connections between, and with the binding posts, 13$^a$, 13$^b$, and 13$^c$, being indicated.

Referring to Figure 3, 15 represents a glass window in door, 17, in chamber, 1, through which the flame may be observed. Lock, 16, is for fastening door, 17. From fuel container, 18, fuel is passed to the flame by drop feed, 18$^a$. Steam ejector pump, 20, forces the flow of gases through chamber, 1, from the exhaust outlet of the furnace, 27. The electrical recording meter is 21, and 22 is a relay in series with the meter, and controlling the operation of alarm bell, 23, the current for which is supplied by battery, 24. Switches, 25 and 26 control their respective circuits.

Referring to Fig. 4, all elements correspond to those shown in Fig. 1, except that the thermo-responsive element is a thermostat device in which 11$_a$ represents a fixed contact base and support, having thereon a contact adjustment screw 11$_c$; at 11$_b$ is represented the thermo responsive element composed of a bimetallic arm. In the external electric circuit are battery 28 and bell 29.

Referring to Fig. 5, there is a thermo responsive element consisting of a gas containing vessel, 32, connected to a pressure recorder, a like vessel, 31, functioning as a temperature compensating element. In the intake pipe is a hot oxidizer wire, 30, in circuit with a thermo circuit breaker, 33, for intermittently connecting element 30. At 34 are the circuit terminals.

The device indicated by Fig. 4 operates only when the inflowing gas in the combustion chamber attains a predetermined state, when the bell circuit is closed by the movement of the bimetallic arm.

Equipped as indicated in Fig. 5, the device operates as follows: As the gas to be tested enters the combustion chamber, its temperature condition affects the pressure of the gas contained in vessel 31, acting as a compensator for the varying temperatures of the entering gas, and the pressure in vessel 32, is controlled by the temperature condition of the flame at 4, the difference being indicated on recorder 21. In inlet pipe at 30, is a heated oxidizer wire, by which incoming CO is converted into $CO_2$, 33 being a thermo circuit breaker for intermittently connecting the oxidizer. The difference in the recorder reading, due to the effect of the oxidizer, as connected and disconnected, represents the percentage of CO present.

In the operation of this system, when the source of combustion has been adjusted by the supply of atmosphere through valve, 7, with a predetermined constant temperature, as indicated by the meter or the recording instrument, a portion of the flue gas or vapor is passed through inlet pipe, I, into the chamber, 1, and out by the pipe, O, by regulation of outlet valve, 14.

If the inflowing atmosphere contains a high percentage of carbon dioxide, or the equivalent of, a diminution of oxygen content, the temperature of the flame will be lowered, with a corresponding effect upon the temperature responsive element, 11, controlling the indicating devices. Compensating for different temperatures of gases before entering the flame area, the thermo couple, 12, will generate a current counter to that generated by element, 11. In this way the temperature effects of the incoming gases are offset.

The atmosphere supporting the source of combustion need not be mechanically forced past the source of combustion in the chamber, 1. This is essential only when gases or vapors from some distant point are to be indicated; otherwise, the draft due to the temperature of the flame, will permit a circulation of those gases and vapors through the open valves and the chamber.

Having thus described my invention, what I claim as new herein and desire to secure by Letters Patent is:

1. In a system for indicating the presence and the concentration of gases and vapors, the combination of a chamber, a source of combustion within said chamber, means for supplying to said source a supporting atmosphere, and means for passing therewith gases and vapors, and means for supplying to said source a constant source of energy; a heat responsive element, so located as to be responsive to temperature variations of said source, and means controlled by said element, for indicating, externally to said chamber, the temperature variations of said source.

2. In a system for indicating the presence and the concentration of gases and vapors, the combination of a chamber, a source of combustion within said chamber, means for supplying to said source a supporting atmosphere, means for passing therewith gases and vapors, and means for supplying a constant source of energy to said source of combustion; a thermo-electrically responsive element, so located as to be responsive to temperature variations of said source of combustion, and means controlled by said element for operating an electrical circuit.

3. In a system for indicating the presence and the concentration of gases and vapors, the combination of a chamber, a source of combustion within said chamber, means for supplying to said source a supporting atmosphere and a constant source of energy, and means for drawing off a portion or all of the gas and vapor products of combustion from a furnace, a fire box or other form of combustion chamber, and passing such gas and vapor products to said source of combustion, a heat responsive element, so located as to be responsive to temperature variations of said source of combustion, and means controlled by said element for indicating, externally to said chamber, the temperature variations of said source.

4. In a system for indicating the presence and the concentration of gases and vapors, the combination of a chamber, a source of combustion within said chamber, means for supplying to said source a supporting atmosphere and a constant source of energy, and means for drawing off a portion or all of the gas and vapor products of combustion from a furnace, a fire box or other form of combustion chamber, and passing such gas and vapor products to said source of combustion, a thermo-electrically responsive element, so located as to be responsive to temperature variations of said source, and means controlled by said element for operating an electrical circuit.

5. In a system for indicating the presence and the concentration of gases and vapors, the combination of a chamber, a source of combustion within said chamber, means for supplying to said source a supporting atmosphere and a constant source of energy, and means for drawing off a portion or all of the gas and vapor products of combustion of a furnace, a fire box or other form of combustion chamber, and passing such gas and vapor products to said source of combustion, a heat responsive element, so located as to be responsive to temperature variations of said source, and means controlled by said element, for indicating, externally to said chamber, the temperature variations of said source, and means for compensating for temperature effects of the gas and vapor products of combustion before the entry thereof into the area of said source of combustion.

6. In a system for indicating the presence and the concentration of gases and vapors, the combination of a chamber, a source of combustion within said chamber, means for supplying to said source a supporting atmosphere and a constant source of energy, and means for drawing off a portion or all of the gas and vapor products of combustion of a furnace, a fire box or other form of combustion chamber, and passing such gas and vapor products to said source of combustion, a thermo-electrically responsive element, so located as to be responsive to the temperature variations of said source, and means controlled by said element for operating an electrical circuit, and means for compensating for temperature effects of the gas and vapor products before the entry thereof into the area of said source of combustion.

7. An apparatus of the character described comprising in combination, a chamber, a source of combustion with means for supplying thereto a constant source of energy and a supporting atmosphere and gases and vapors, a heat responsive element, so located as to be responsive to temperature variations of said source of combustion, and means controlled by said element for indicating externally to said chamber, said temperature variations.

8. An apparatus of the character described comprising, in combination, a chamber, a source of combustion, with means for supplying thereto a constant source of energy and a supporting atmosphere and gases and vapors, a thermoelectrically responsive element, so located as to be responsive to temperature variations of said source of combustion and means controlled by said element for actuating an electrical circuit.

9. An apparatus of the character described comprising, in combination, a chamber, a source of heat with means for supplying fuel to said source, means for discharging a gas in contact with said source, a heat responsive element, so located within said chamber as to be responsive to thermal changes of said gas so discharged in contact with said source, and means controlled by said heat responsive element for indicating said thermal changes.

10. An apparatus of the character described comprising, in combination, a chamber, a source of heat therein, means for supplying fuel to said source, means for discharging a gas in contact with said source, a heat responsive element within said chamber adapted and arranged to be responsive to thermal changes of said gas and means controlled by said heat responsive element for actuating an electrical circuit.

Signed at New York city in the county of New York and State of New York this 21st day of November A. D. 1921.

SAMUEL RUBEN.